Sept. 25, 1956 H. F. TEICHROEW 2,764,626
ELECTRIC-WIRE HOLDERS AND INSTALLATIONS
Filed Dec. 11, 1950

INVENTOR.
HAROLD F. TEICHROEW
BY
Reynolds, Beach & Christensen
ATTORNEYS

:::::::::::::::::::::::::::::::::::::::::::::::::::::::::::::::::::::::::::::::::::::::::::::::::::::::::::::::::::::::::

United States Patent Office 2,764,626
Patented Sept. 25, 1956

2,764,626
ELECTRIC-WIRE HOLDERS AND INSTALLATIONS

Harold F. Teichroew, Seattle, Wash., assignor to Boeing Airplane Company, Seattle, Wash., a corporation of Delaware Application December 11, 1950, Serial No. 200,244

3 Claims. (Cl. 174—174)

This invention relates to electrical wiring techniques, and more particularly to the mounting of bundled electrical conductors in fixed relation to a support. The invention, while having more general application, is herein illustratively described by reference to the problem of supporting long runs of electric wires in airplanes and similar vehicles wherein reliability, durability and conservation of weight and space, also convenient accessibility to the installed wires are highly important factors.

A specific consideration in airplane wiring installations is that of keeping the wire bundles strung close alongside the fuselage shell or other structural parts of the airplane, and yet spacing the wires out of contact with the adjacent parts which might chafe the insulation and cause grounding. Moreover, from the maintenance standpoint, should a fault occur in the wiring for any reason, testing and replacement of individual wires can be accomplished expeditiously only if the holder permits taking the bundle apart readily.

In past practice wire bundle holders were of the ring or clamp type, the bundle being encircled by the body of the holder, which in turn was bolted to the airplane fuselage or other structural part. However, such a technique required many different sizes of ring holders, because of the considerable variation in diameter of the different wire bundles which might be encountered. With such holders any reworking or modification of an existing wiring installation required tedious unbolting of the clamps in order to free the bundle of wires, and if upon completing the job the size of the bundle had been changed, a replacement clamp of a different size would then be required. Another difficulty experienced with that type of holder was the possibility of faults resulting from the wires being pinched too tightly in a clamp too small for the particular bundle diameter. On the other hand, use of oversize clamps would permit loose vibration of the bundle and consequent chafing of the wire insulation. Furthermore the insulation on certain types of rubber-covered wires was often loosened to leave bare wire in contact with metal surfaces.

My present invention, therefore, is aimed at meeting the foregoing problems while satisfying the various considerations mentioned.

A more specific object is a wire holder which, of a given size, will accommodate wire in bundles varying widely as to diameter and number of wires contained therein.

Still another object is a holder permitting of installation and removal of a bundle of wires thereon without necessity of disconnecting the holder from its support, nor of taking apart the bundle or disconnecting its wires from their electric circuit terminal elements. Moreover, if in the course of repairing or modifying the wiring it should be necessary to change the size of the bundle, this in no way prevents returning the modified bundle back to the same holder, nor alters the character of support which it receives therefrom.

Still another object is a wire bundle holder, the use of which after installation requires no special tools whatever to install wires thereon, or to make removals or replacements of wires thereon.

Yet another object is such a wire holder which can be made entirely from insulating material such that even should direct contact occur between the holder and a conductor wire, the electrical system would be unaffected thereby.

In carrying out the invention a group of wires to be supported on a holder may either be wrapped together in a bundle at the outset, i. e. before installation on the holder, or may be wrapped in conjunction with application of the wires to the holder. Moreover, application of the wires to the holder and securement of the holder to its support need not be conducted in any particular sequence, being independent operations.

Preferably the wire holder is of cruciform shape, as herein illustrated, one or more wires of a bundle being received in a plurality of reentrant corners of the cross in the usual installation, and by that means the entire bundle held against coming off the holder in any direction when the wires are appropriately held together against spreading. The arms of the holder are oblong in cross section in planes perpendicular to their common plane, and the arm or segment on which the holder base is connected tapers from the base to the arm intersection.

These and other features, objects and advantages of the invention will be more fully appreciated from the following detailed description based upon the accompanying drawings illustrating the invention in its preferred form. It is particularly emphasized, however, that the cruciform shape is by no means the only shape or configuration of holder which may be used for purposes of the invention, but constitutes the one presently preferred in the majority of applications now visualized.

Figure 5:
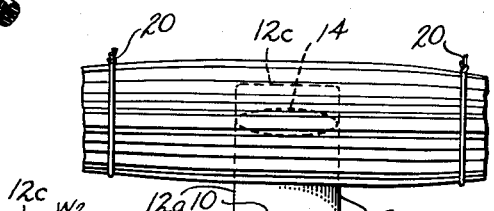
Figure 5 is a sectional view taken on line 5—5 of Figure 4.

In the form illustrated each wire-bundle holder comprises a supporting base portion 10, a post 12 projecting from the base portion, and one or more lateral projections, such as the aligned arms 14, on the post portion. Post 12 is of generally rectangular shape when viewed from the side—i. e. as in Fig. 5—and for purposes of description may be said to have spaced front and rear edges 12a and 12b respectively which in the disclosed embodiment project perpendicularly from base 10 to a distal edge 12c. The opposed side surfaces of post 12 are convexly curved in the direction of their extent between front and rear edges 12a and 12b, the degree of convex curvature being quite small so that the maximum thickness between the opposed side surfaces is substantially smaller than the minimum or straight line distance between front and rear edges 12a and 12b. By this arrangement, the post has a cross section in the form of an elongated ellipse whose major axis will be oriented in a direction parallel to the direction of extent of the wire bundle to be supported.

Arms 14 are shaped in a form generally similar to post 12 and have convexly curved opposed surfaces extending between front and rear edges 14a and 14b respectively. Front and rear edges 14a and 14b are perpendicular to and coplanar with the respective front and rear edges 12a and 12b of post 12. Arms 14 are likewise of elongated elliptical cross-section, the major axis of such ellipses extending parallel to those of post 12.

When the holder is oriented with respect to the direction of extent of the wire bundle as shown in the drawings, the elongated elliptical cross-sectional form of post 12 and arms 14 affords a support which is extended along the wire bundle while simultaneously presenting a minimum or reduced area of generally cruciform shape to the bundle, thus minimizing the transverse displacement of the wires passing around the holder. The intersection of post 12 and arms 14 may be said to define a line of juncture which extends from the intersection of front edges 12a and 14a to rear edges 12b and 14b in a direction generally parallel to distal edge 12c. In use, the holder and wire are oriented so that the line of juncture referred to above is coincident with or parallel to the longitudinal axis of the wire bundle. Because of such gradual curvature and bluntly rounded arm ends the arms and post present no sharp corners to chafe the insulation of wires extending generally parallel to the junction line or lines of the arms and post, and such wires will not be bent sharply even if bound together tightly at locations adjacent to opposite edges of the post, but will be frictionally held against sliding and chafing. For reasons later mentioned that part of the post 12 between the arms 14 and the base 10 is somewhat longer than the arms. Preferably the entire unit, including one or more holders and the associated mounting base 10, is formed of electrical insulating material, such as molded synthetic resin, of which there are various suitable types.

The supporting base 10 may be fixed to the airplane structure or other object in any convenient manner. As shown, such base is adapted for mounting by bolts 16 passed through apertures 18 therein. The holder post stands at right angles to the base and thereby projects directly outward from the supporting part of the airplane to maintain the wires carried by the holder out of contact therewith.

Figure 1:
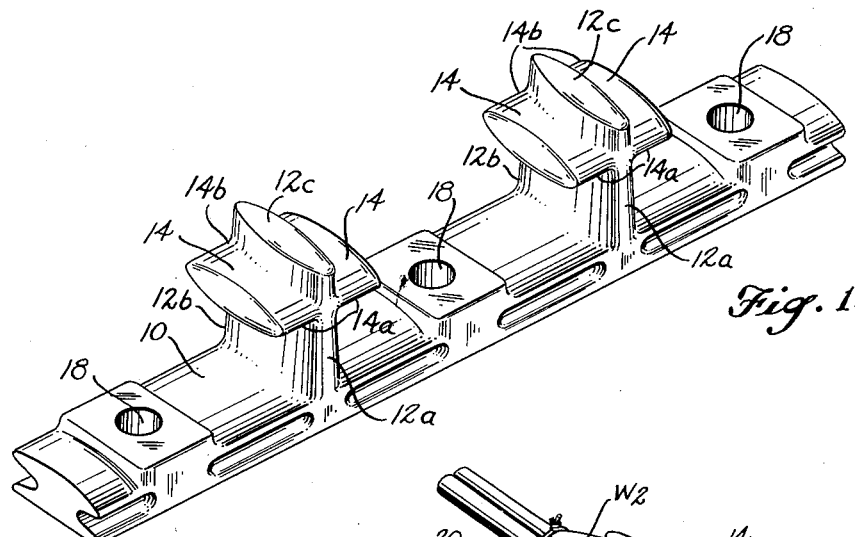
Figure 1 is a perspective view of two holders having a common supporting base.
Figure 2:
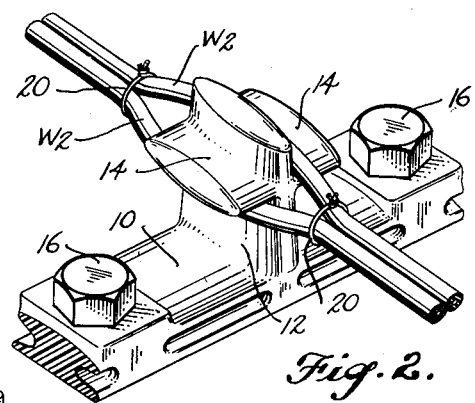
Figure 2 is a perspective view of such a holder carrying a bundle made up of two wires.

Figure 2 illustrates the installation of a two-wire bundle upon a cruciform holder. In this case the wires W2 are received in opposite reentrant corners defined by adjacent surfaces of the holder arms and post. Thus when tied together by lacing twine 20 or the like at locations adjacent opposite edges of the holder the wires are retained positively against movement in any transverse direction. If in the case of a two-wire bundle the individual wires are placed in adjacent reentrant corners of the holder they could conceivably slide off the end of the intervening element, whether an arm or the post end, unless the wires were lashed to the holder by separate means.

Figure 3:
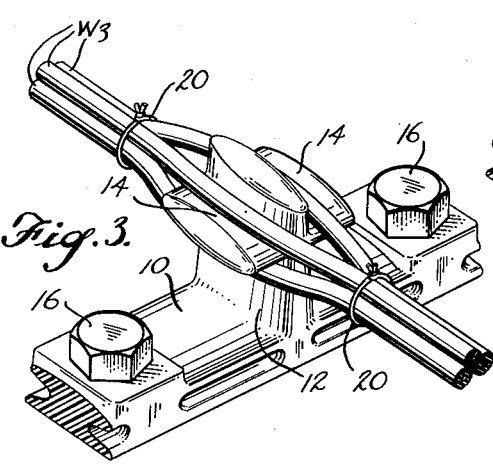
Figure 3 is a similar view in which the holder carries a bundle of three wires.

Figure 3 illustrates the application of a three-wire bundle to the cruciform holder. In this instance the wires W3 are placed in any three of the reentrant corners of the holder, and banded as before, and with like effect. Additional wires could then be placed in the remaining reentrant corner of the holder or, if desired, could be laid variously in any of the reentrant corners of the holder. The three-wire arrangement of Figure 3 also appears in the holder at the left in Figure 4.

Figure 4:
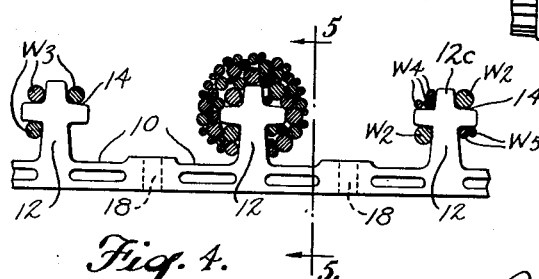
Figure 4 is a side view of an installation comprising three holders on a common supporting base with wire bundles of different sizes and arrangements carried by the respective holders.

At the right in Figure 4 the two-wire bundle of Figure 2 has been increased by the addition of three wires W4 placed in one vacant corner of the holder, and two more wires W5 placed in the remaining corner thereof, making a bundle of seven wires altogether.

The middle holder in Figure 4 carries a large number of wires. As before they are bound together in a bundle at locations adjacent opposite sides of the holder (see Figure 5). A given holder may therefore be used in the same way whether a bundle is made up of two wires or of many times that number, and irrespective of the size of the bundle within a wide range of variation.

The length of post portion 12 between the base 10 and the arms 14 is selected to be somewhat greater than the radius of the largest cylindrical bundle of wires intended to be carried by the holder, so that the wires nearest the support remain spaced outward somewhat from the aircraft structure upon which the holder is mounted. The arms and the outer part of the post, which outer part also constitutes an arm or arm portion of the holder, need not be as long, because, although their ends may be completely concealed within a large bundle of wires, for instance, that bundle is nevertheless as effectively retained on the holder as a small bundle would be. In either case the wires in the bundle are recived in the reentrant corners defined by adjacent surfaces of the diversely directed holder elements, as shown. The taper of the post 12 from the base to the arm intersection causes a tendency of the bundled wires to slide toward and remain at the arm intersection as desired, hence, out of contact with any metal surfaces on which such base may be mounted. Also, such taper of the post together with its oblong cross section adds strength thereto for resisting tension in the wires especially on installation.

Obviously any number of holder elements in series relationship may be carried by a single supporting base without altering the application of the invention to the supporting of wire bundles. The particular shape and dimensions of the holder portions and the specific configuration of the holder may vary within the principles of the invention.

I claim as my invention:

1. An electrical installation comprising a support structure, a wire bundle having a plurality of wires extending in a common direction, a holder for supporting said wire bundle upon said support structure comprising a base fixedly mounted upon said support structure, a post of electrical insulating material projecting perpendicularly from said base into said bundle, said post having front and rear edges spaced from each other in said common direction and a distal edge extending between said front and rear edges in said common direction, convexly curved opposed side surfaces extending between said front and rear edges, the minimum distance between said front and rear edges being substantially greater than the maximum thickness between said side surfaces, aligned arms of electrical insulating material projecting from said opposed side surfaces within said bundle at a location intermediate said base and said distal edge, said arms having front and rear edges spaced from each other in said common direction and convexly curved opposed surfaces extending between said last mentioned front and rear edges, the minimum distance between said front and rear edges of said arms being substantially greater than the maximum thickness between said opposed surfaces of said arms, and means for binding said bundle to engage portions of the wires thereof with the aforementioned surfaces.

2. In an electrical installation including a bound wire bundle having a plurality of wires extending in a common direction and a support structure; the improvement comprising a holder for mounting said bundle in spaced relationship to said support structure, said holder comprising a mounting base of electrical insulating material securable to said support, a post of electrical insulating material integral with and projecting perpendicularly from said base, said post having spaced front and rear edges extending from said base to a distal edge, opposed side surfaces on said post convexly curved in their extent between said front and rear edges, the minimum distance between said front and rear edges being substantially greater than the maximum thickness between said side surfaces, a pair of aligned arms of electrical insulating material integral with and projecting from opposed side surfaces of said post, said arms intersecting said post along a line of juncture substantially parallel to said distal edge at a location intermediate said distal edge and said base, front and rear edges on said arms intersecting said line of juncture at spaced locations, convexly curved opposed surfaces extending between said front and rear edges of said arms, the minimum distance between said front and rear edges of said arms being substantially greater than the maximum thickness of said arms between said opposed surfaces, whereby said bundle of wires may be engaged with said opposed surfaces of said post and said arms with a minimum displacement of said wires from said common direction when said line of juncture is oriented parallel thereto.

3. A holder for supporting a bound wire bundle having a plurality of wires extending in a common direction at a position spaced from a supporting structure, comprising a mounting base of electrical insulating material fixedly engageable with said support structure, a post of electrical insulating material integral with and projecting from said base, said post having spaced front and rear edges extending perpendicularly from said base to a distal edge, opposed side surfaces on said post convexly curved in their extent between said front and rear edges and inclined inwardly toward each other in their extent away from said base, the minimum distance between said front and rear edges being substantially greater than the maximum thickness between said side surfaces, a pair of arms of electrical insulating material integral with and projecting perpendicularly from opposed side surfaces of said post along a line of juncture intermediate said base and said distal edge, said arms having aligned front edges and aligned rear edges respectively coplanar with the front and rear edges of said post, convexly curved opposed surfaces on each of said arms extending between the front and rear edges of said arms, the minimum distance between said front and rear edges of said arms being substantially greater than the maximum thickness between the opposed surfaces of said arms, the intersections of the aforementioned surfaces of said post and said arms defining four reentrant corners extending from the front edges of said holder to the rear edges of said holder wherein the wires of said wire bundle may be engaged when said line of juncture is oriented parallel to said common direction.

References Cited in the file of this patent

UNITED STATES PATENTS

| | | |
|---|---|---|
| 51,934 | Ely | Jan. 9, 1866 |
| 138,115 | Austin | Apr. 22, 1873 |
| 347,635 | O'Brien | Aug. 17, 1886 |
| 396,847 | Ashen | Jan. 29, 1889 |
| 1,022,993 | Willis | Apr. 9, 1912 |
| 1,225,460 | McCarthy | May 8, 1917 |
| 1,856,109 | Murray | May 3, 1932 |

FOREIGN PATENTS

| | | |
|---|---|---|
| 90,067 | Austria | Nov. 25, 1922 |